(12) United States Patent
Wu et al.

(10) Patent No.: US 7,640,844 B2
(45) Date of Patent: Jan. 5, 2010

(54) COFFEE MACHINE WITH IMPROVED COFFEE OUTLET

(75) Inventors: Mingchia Wu, Tan Zi Hsiang (TW); Kuohsun Lin, Ren Teh Hsiang (TW); Shengfang Cheng, Anding Hsiang (TW)

(73) Assignee: Tsann Kuen (China) Enterprise Co., Ltd., Fujian (CN)

( * ) Notice: Subject to any disclaimer, the term of this patent is extended or adjusted under 35 U.S.C. 154(b) by 0 days.

(21) Appl. No.: 11/784,225

(22) Filed: Apr. 6, 2007

(65) Prior Publication Data

US 2007/0251395 A1 Nov. 1, 2007

(51) Int. Cl.
*A47J 31/00* (2006.01)

(52) U.S. Cl. .............................. 99/299; 99/304; 99/307; 99/313

(58) Field of Classification Search ........... 99/275–277, 99/279–307, 323, 452, 495, 308–322
See application file for complete search history.

(56) References Cited

U.S. PATENT DOCUMENTS

| | | | | |
|---|---|---|---|---|
| 2,451,195 A | * | 10/1948 | Brown | 99/295 |
| 4,064,795 A | * | 12/1977 | Ackerman | 99/304 |
| 5,711,207 A | * | 1/1998 | Wu | 99/307 |
| 5,964,143 A | * | 10/1999 | Driscoll et al. | 99/299 |
| 6,543,335 B1 | * | 4/2003 | Lassota | 99/283 |

FOREIGN PATENT DOCUMENTS

CH 695183 A5 * 1/2006

* cited by examiner

*Primary Examiner*—Timothy F. Simone
(74) *Attorney, Agent, or Firm*—Rabin & Berdo, P.C.

(57) ABSTRACT

A coffee machine includes: a base, a basal body locating above the base, a coffee pot located above the basal body, a first coffee exit located in the bottom of the coffee pot, a coffee outlet located under the first coffee exit, the coffee outlet includes a receiving water base, a top lid; a first pin joint part and a second pin joint part respectively located at both sides of the first coffee exit, one end of the receiving water base pivotally joins the first pin joint part, another end of the receiving water base extends to the second pin joint part and outside of the bottom of the coffee pot, a second coffee exit is beside the another end of the receiving water base, a third pin joint part is between the second coffee exit and the second pin joint part.

5 Claims, 4 Drawing Sheets

COFFEE MACHINE WITH IMPROVED COFFEE OUTLET

TECHNICAL FIELD

The utility model relates to a coffee machine, concretely to a coffee machine with improved coffee outlet.

BACKGROUND OF TECHNOLOGY

Known coffee machine comprises a base, a basal body and a coffee pot, the basal body locates above one side of the base, the coffee pot locates at the side of the upside of the basal body, and the coffee pot and another side of the base correspond up and down, namely, the room for placing the coffee cup forms between the coffee pot and the another side of the base, so the coffee in the coffee pot dribbles into the coffee cup. Coffee bag with coffee powder sets in the coffee pot, the basal body also includes a hot-water heater and a water pump for driving the hot-water to the coffee pot, the coffee exit locates at the downside of the coffee pot, when the coffee cup set under the coffee pot to open the valve, the coffee will effuse from the coffee pot.

Above coffee machine has biggish limitation in the structure design, it can't break through the limitation of the coffee pot being above the coffee cup, which occupies biggish room. In addition, when the coffee cup is taken away from the coffee machine, although the valve is closed, but because it has some distance between the valve and the coffee exit, it also has some coffee between the valve and the coffee exit, consequently, it will cause the unnecessary waste and is inconvenient in use.

SUMMARY

The present utility model provides a coffee machine with an improved coffee outlet to break through the limitation of the coffee pot being above the coffee cup or carafe and make the coffee machine have an alterable structure to economize the size of the coffee machine for storage purposes. Another purpose of the utility model is to overcome the disadvantages of known coffee machines which waste coffee and are inconvenient to use.

The present utility model adopts the technical proposal as follows: a coffee machine with improved coffee outlet, comprising a base, a basal body locating above the base, a coffee pot locating above the basal body, a first coffee exit locates in the bottom of the coffee pot, the coffee outlet locates under the first coffee exit, the coffee outlet comprises a receiving water base, a top lid, a hinge; a first pin joint part and a second pin joint part respectively locate at both sides of the first coffee exit, one end of the receiving water base pivotally joins with the first pin joint part, another end of the receiving water base extends to the second pin joint part and outside of the bottom of the coffee pot, a second coffee exit locates beside the another end of the receiving water base, the top lid covers the rest parts of the receiving water part other than the parts under the bottom of the coffee pot; a third pin joint part locates between the second coffee exit and the second pin joint part, one end of the hinge pivotally joins with the second pin joint part, the middle position of the hinge pivotally joins with the third pin joint part, another end of the hinge extends above the second coffee exit; a pole piece locates at the receiving water base and drills through the first coffee exit, the pole piece includes a first obturation piece tightly tipping the first coffee exit, the hinge includes a second obturation piece tightly tipping the second coffee exit; a compression spring locates between the coffee pot and the receiving water base.

As a rule, in the effect of the elasticity of the compression spring, when the coffee outlet arrives at its lowest position, here the first obturation piece tightly tips the first coffee exit to make it close, on account of lever principle, the second obturation piece of the hinge tightly tips the second coffee exit to make it close, consequently, even if the coffee outlet has a little coffee, it will not effuse when the coffee cup is taken away; by contraries, when the coffee cup placed under the coffee outlet, the coffee cup overcomes the elasticity of the compression spring, the coffee cup tips the coffee outlet to make the first coffee exit and the second coffee exit open, so the coffee in the coffee pot inpours into the coffee cup through the coffee outlet.

Above coffee machine with improved coffee outlet wherein the first coffee exit protrudes downwards to form a round platform, the receiving water base includes several orientation pieces around the pole piece; the upside of the compression spring covers the exterior of the round platform, the downside of the compression spring is positioned by the orientation pieces.

Above coffee machine with improved coffee outlet wherein the coffee pot wedges into the upside of the basal body, the coffee outlet protrudes outside of the basal body, the base extends outward to form a pedestal for placing coffee cup underneath the coffee outlet, a placement space for coffee cup forms between the pedestal for placing coffee cup and the coffee outlet. Thus it can be seen, the coffee pot is not above the coffee cup but wedges into the basal body, merely one part of the coffee outlet protrudes outside of the basal body, which breaks through the localization of the conventional coffee machine and economizes the room of the coffee pot occupying.

Above coffee machine with improved coffee outlet wherein an overflow orifice locates above the receiving water base, the circumference of the overflow orifice forms a overflow room segregating with other parts of the coffee pot by a circle wall, the height of the circle wall is lower than the height of the coffee pot, when the height of the coffee in the coffee pot is higher than the circle wall, the coffee will effuses from the overflow orifice.

Above coffee machine with improved coffee outlet wherein the receiving water base includes a circle wall protruding upwards, the circle wall surrounds the second coffee exit and the pole piece, the part of the receiving water base in the circle wall forms a coffee launder.

The present utility model has virtues as follows comparing with known technology: firstly, it breaks through the localization of the coffee pot being above the coffee cup, to make the coffee machine has alterable structure, to economize the room of the coffee machine occupying; Secondly, when the coffee cup is taken away from the underside of the coffee outlet, there will be no remnants coffee effuses from the coffee outlet, to accord with the require of economy and environmental protection.

DETAILED DESCRIPTION

Referring to FIGS. 1 to 5, we will expound the embodiment of the present utility model.

Figure 1:
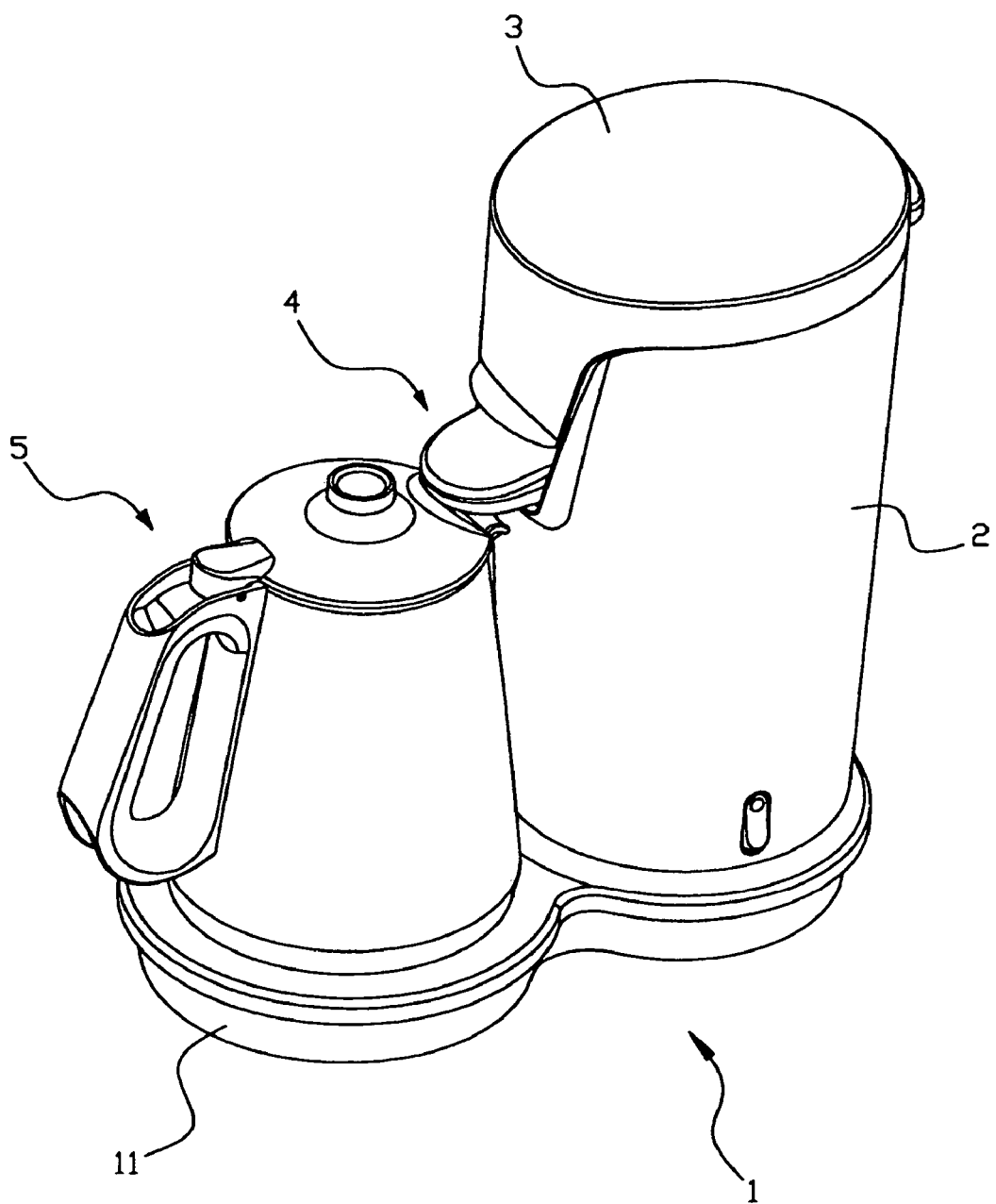
FIG. 1 is a stereogram of the present utility model.
Figure 2:
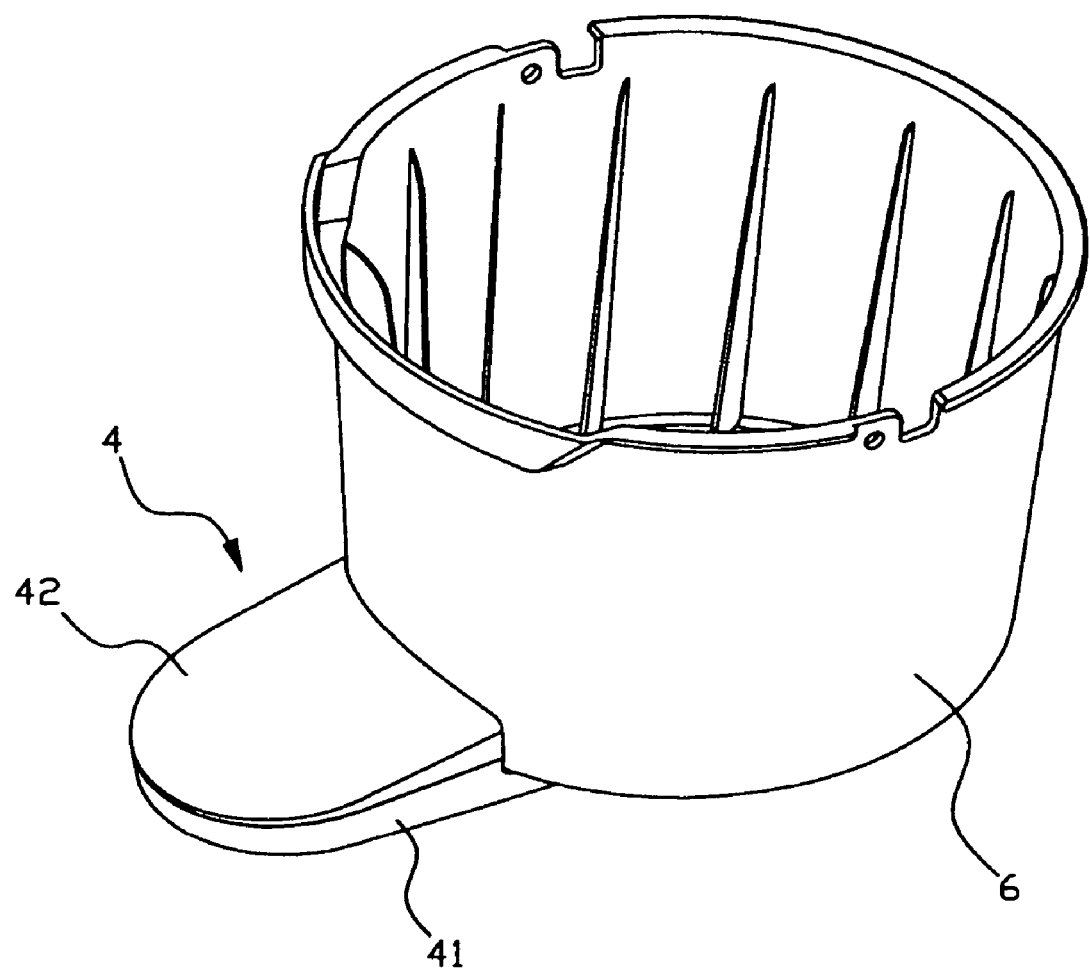
FIG. 2 is a stereogram of the coffee pot and the coffee outlet.

Referring to FIGS. 1 and 2, the coffee machine with improved coffee outlet, comprising a base 1, a basal body 2 locating above the base 1, a coffee pot 6 locating above the basal body 2, a coffee outlet 4 being below the coffee pot 6 and extending outside of one side of the coffee pot 6. The coffee pot 6 wedges into the upside of the basal body 2, the basal body 2 includes a lid 3 which covers the coffee pot 6. The coffee outlet 4 protrudes outside of the basal body 2, the base 1 extends outward to form a pedestal 11 for placing coffee cup underneath the coffee outlet 4, a placement space for coffee cup forms between the pedestal 11 for placing coffee cup and the coffee outlet 4, when the coffee cup 5 is placed in the placement space, the top of the coffee cup 5 jacks up the coffee outlet 4 to make the coffee outlet turn on so that the coffee inpours into the coffee cup 5 from the coffee pot 6. The basal body 2 also includes a hot-water heater and a water pump for driving the hot-water to the coffee pot 6, which is known technology, we do not expound here.

Figure 3:
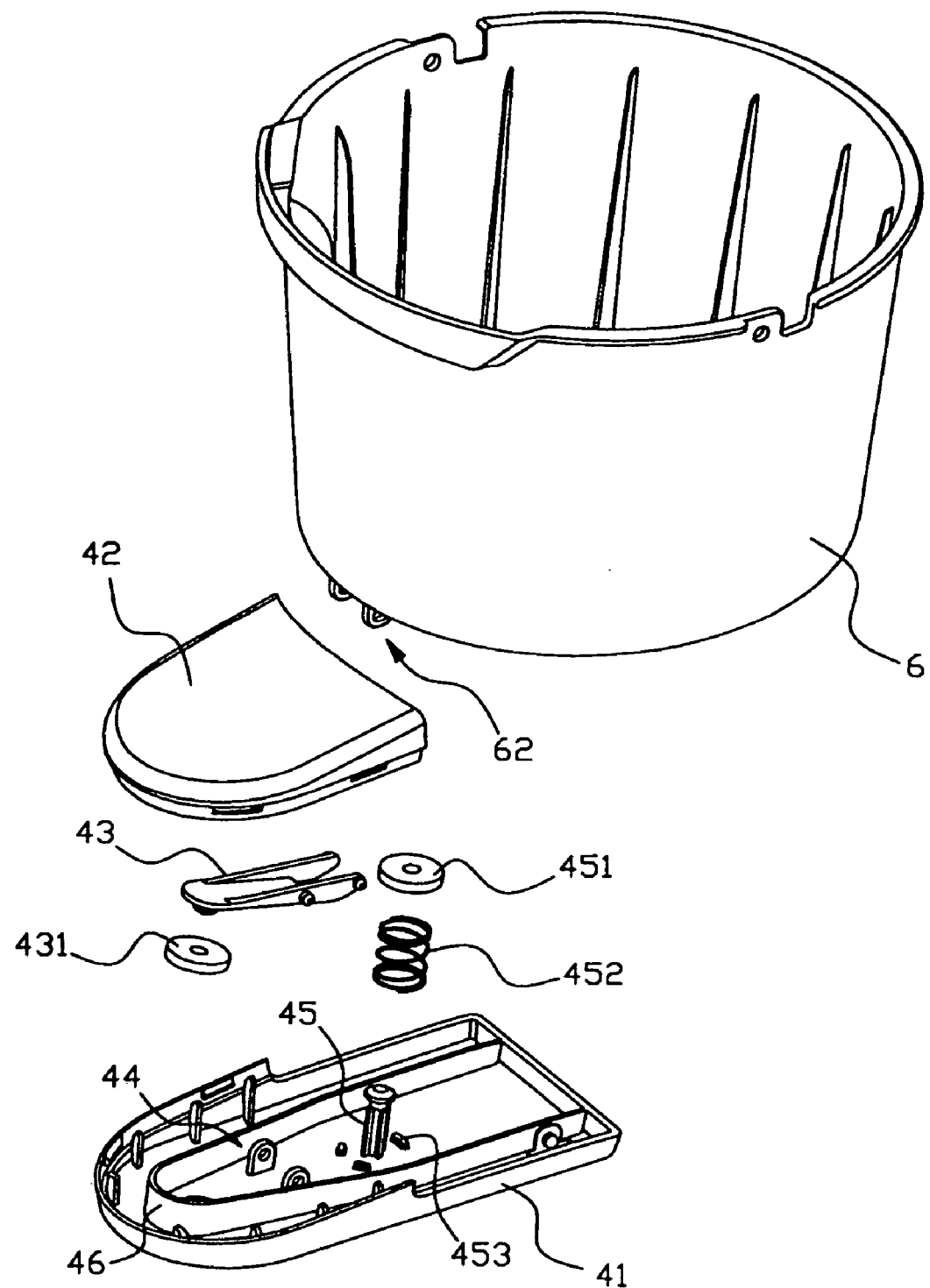
FIG. 3 is an exploded view of the coffee pot and the coffee outlet.
Figure 4:
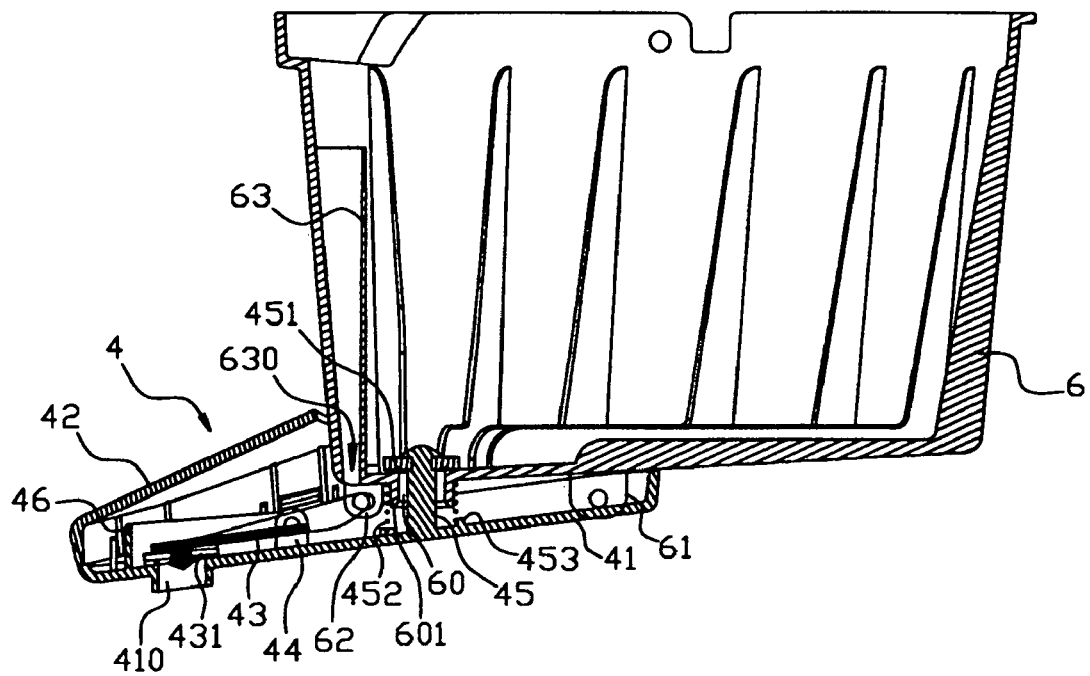
FIG. 4 is a cutaway view of the coffee pot and the coffee outlet, which shows the opposition of the coffee outlet.

Referring to FIGS. 3 and 4, a first coffee exit 60 locates in the bottom of the coffee pot 6, the coffee outlet 4 locates under the first coffee exit 60. The coffee outlet 4 comprises a receiving water base 41, a top lid 42, a hinge 43; a first pin joint part 61 and a second pin joint part 62 respectively locate at both sides of the first coffee exit 60, one end of the receiving water base 41 pivotally joins with the first pin joint part 61, another end of the receiving water base 41 extends to the second pin joint part 62 and outside of the bottom of the coffee pot 6, a second coffee exit 410 locates beside the another end of the receiving water base 41, the top lid 42 covers the rest parts of the receiving water part 41 other than the parts under the bottom of the coffee pot 6; a third pin joint part 44 locates between the second coffee exit 410 and the second pin joint part 62, one end of the hinge 43 pivotally joins with the second pin joint part 62, the middle position of the hinge 43 pivotally joins with the third pin joint part 44, another end of the hinge 43 extends above the second coffee exit 410; a pole piece 45 locates at the receiving water base 41 and drills through the first coffee exit 60, the pole piece 45 includes a first obturation piece 451 tightly tipping the first coffee exit 60, the hinge 43 includes a second obturation piece 431 tightly tipping the second coffee exit 410, a compression spring 452 locates between the coffee pot 6 and the receiving water base 41.

Referring to FIGS. 2 and 3, the first coffee exit 60 protrudes downwards to form a round platform 601, the receiving water base 41 includes three orientation pieces 453 around the pole piece 45; the upside of the compression spring 452 covers the exterior of the round platform 601, the downside of the compression spring 452 is positioned by the orientation pieces 453. The receiving water base 41 includes a circle wall 46 protruding upwards, the circle wall 46 surrounds the second coffee exit 410 and the pole piece 45, the part of the receiving water base 41 in the circle wall 46 forms a coffee launder. An overflow orifice 630 locates at one side of the bottom of the coffee pot 6, the overflow orifice 630 locates above the receiving water base 41, the circumference of the overflow orifice 630 forms a overflow room segregating with other parts of the coffee pot 6 by a circle wall 63, the height of the circle wall 63 is lower than the height of the coffee pot 6. When the height of the coffee in the coffee pot 6 is higher than the height of the circle wall 63, the coffee will flow to the coffee outlet 4.

Figure 5:
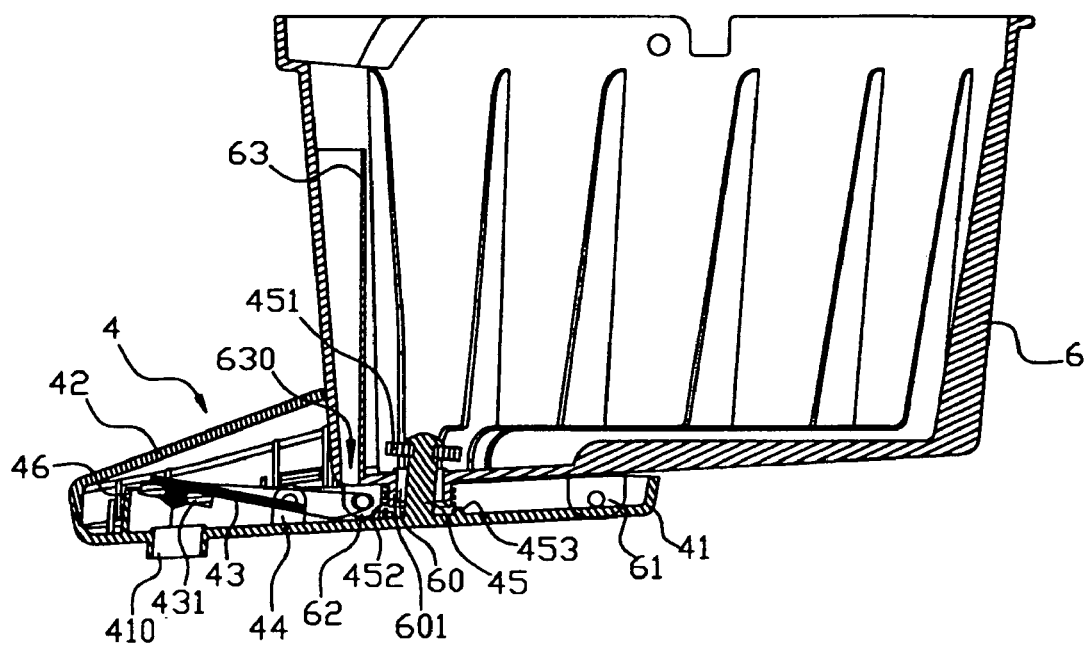
FIG. 5 is a cutaway view of the coffee pot and the coffee outlet, which shows the open position of the coffee outlet.

Referring to FIG. 4, when the coffee outlet 4 arrives at its lowest position the first obturation piece 45 tightly tips the first coffee exit 60 to make it close, on account of a lever principle, the second obturation piece 431 of the hinge 43 tightly tips the second coffee exit to make it close, consequently, even if the coffee outlet 4 has a little coffee, it will not effuse when the coffee cup 5 is taken away. Referring to FIG. 5, when the coffee cup or carafe 5 placed under the coffee outlet 4, the coffee cup 5 overcomes the elasticity of the compression spring 452, the coffee cup 5 tips the coffee outlet 4 to make the first coffee exit 60 and the second coffee exit 410 open, so the coffee in the coffee pot 6 inpours into the coffee cup 5 through the coffee outlet 4.

While the present utility model has been described in connection with what is considered the most practical and preferred embodiment, it is understood that present utility model is not limited to the disclosed embodiment but is intended to cover various arrangements included within the spirit and scope of the broadest interpretation so as to encompass all such modifications and equivalent arrangements.

The invention claimed is:

1. A coffee machine with an improved coffee outlet, comprising:
  a base;
  a basal body located above the base;
  a coffee pot located above the basal body;
  a first coffee exit located in a bottom of the coffee pot;
  a coffee outlet located under the first coffee exit, the coffee outlet including a receiving water base, a top lid, and a hinge;
  a first pin joint part and a second pin joint part are respectively located at both sides of the first coffee exit, one end of the receiving water base pivotally joins the first pin joint part, another end of the receiving water base extends to the second pin joint part and outside of the bottom of the coffee pot;
  a second coffee exit is located beside the another end of the receiving water base, the top lid covers remaining parts of the receiving water base other than parts under a bottom of the coffee pot;
  a third pin joint part is located between the second coffee exit and the second pin joint part, one end of the hinge is pivotally joined with the second pin joint part, a middle position of the hinge is pivotally joined with the third pin joint part, another end of the hinge extends above the second coffee exit;
  a pole piece is located at the receiving water base and extends through the first coffee exit, the pole piece includes a first obturation piece tightly tipping the first coffee exit, the hinge includes a second obturation piece tightly tipping the second coffee exit; and
  a compression spring is located between the coffee pot and the receiving water base so that coffee flows from said first coffee exit and said second coffee exit only when a cu is placed under and engages the coffee outlet, said engagement of said cup with the coffee outlet simultaneously actuating said second obturation piece away from said second coffee exit.

2. The coffee machine with an improved coffee outlet according to claim 1, wherein said first coffee exit protrudes downwards to form a round platform, the receiving water base includes several orientation pieces around the pole piece; an upside of the compression spring covers the exterior of the round platform, a downside of the compression spring is positioned by the orientation pieces.

3. The coffee machine with an improved coffee outlet according to claim 1, wherein said coffee pot wedges into an upside of the basal body, the coffee outlet protrudes outside of the basal body, the base extends outward to form a pedestal for placing coffee cup underneath the coffee outlet, a placement space for coffee cup is formed between the pedestal for placing the coffee cup and the coffee outlet.

4. The coffee machine with an improved coffee outlet according to claim 1, wherein an overflow orifice is located above the receiving water base, a circumference of the overflow orifice forms an overflow room segregated with other parts of the coffee pot by a circular wall, the height of the circular wall is lower than the height of the coffee pot.

5. The coffee machine with an improved coffee outlet according to claim 1, wherein said receiving water base includes a circular wall protruding upwards, the circular wall surrounds the second coffee exit and the pole piece, wherein a part of the receiving water base in the circular wall forms a coffee launder.

* * * * *